United States Patent [19]
Sturm et al.

[11] 3,711,600
[45] Jan. 16, 1973

[54] PROCESS FOR PREPARING CALCINED OXIDES

[75] Inventors: Bernard J. Sturm; Roger B. Quincy, Jr., both of Oak Ridge, Tenn.; Charles T. Butler, Stillwater, Okla.

[73] Assignee: The United States of America as represented by the United States Atomic Energy Commission

[22] Filed: Dec. 22, 1970

[21] Appl. No.: 100,775

[52] U.S. Cl. ................................................. 423/639
[51] Int. Cl. ........................... C01f 5/08, C01f 11/04
[58] Field of Search ........ 23/186, 201; 423/639, 164

[56] References Cited

UNITED STATES PATENTS

| | | |
|---|---|---|
| 1,975,954 | 10/1934 | Kippe ................................... 23/201 |
| 2,130,240 | 9/1938 | Kippe ................................... 23/201 |
| 2,912,306 | 11/1959 | Kippe ................................... 23/201 |
| 2,801,155 | 7/1957 | Kippe ................................... 23/201 |
| 2,641,529 | 6/1953 | Austin .................................. 23/201 |
| 3,341,290 | 9/1967 | Bornemann et al. .................. 23/201 |

*Primary Examiner*—Oscar R. Vertiz
*Assistant Examiner*—G. Alvaro
*Attorney*—Roland A. Anderson

[57] ABSTRACT

A method for preparing calcined calcium oxide or magnesium oxide, particularly in high-bulk-density form. An aqueous solution of the nitrate of the alkaline earth metal is made strongly basic to precipitate the hydroxide. The precipitate is recovered and then washed to reduce the nitrate concentration therein to within 0.5 to 15 weight percent. The washed precipitate is calcined at from 1,200 to 1,500°C for about 5 to 30 hours to produce the desired oxide.

8 Claims, No Drawings

PROCESS FOR PREPARING CALCINED OXIDES

BACKGROUND OF THE INVENTION

This invention was made in the course of, or under, a contract with the U.S. Atomic Energy Commission.

This invention relates to a method for the production of calcined calcium oxide or magnesium oxide powders, and more particularly to a method whereby calcined calcium oxide and magnesium oxide powders of comparatively high bulk density are produced at temperatures below about 1,500°C.

Magnesium oxide and calcium oxide powders having bulk densities above about 1.3 g/cc and 1.5 g/cc, respectively, can be produced by calcining the oxides at temperatures above about 1,600°C. Calcination at such high temperatures is, however, subject to several disadvantages. For example, the furnaces required are expensive and in general have a comparatively small capacity. Furthermore, the powders being processed may be contaminated to an objectionable degree by the vapors of various structural components of the furnace.

The calcination at temperatures below about 1,500°C of various precursors of magnesium oxide (MgO) yields magnesium oxide powder with a bulk density in the range of about 0.3 to 1.0 g/cc. Magnesium oxide with a higher bulk density would be of advantage in various applications—such as in the fabrication of magnesia firebricks, crucibles, and cements. In some applications, such as the production of single MgO crystals by submerged-arc fusion, it is essential that the MgO powder to be fused have a bulk density exceeding about 1.2 g/cc. In this latter application, where crystals of very high purity are desired, it is also important that the MgO powder contain very low concentrations of various impurities, particularly iron and aluminum.

Similarly, calcium oxide powder with a comparatively low bulk density ($\approx 1.0$ g/cc) is obtained by the calcination at temperatures below about 1,500°C of various precursors of the oxide. Here, too, a higher bulk density often would be of advantage, as well as a high purity with respect to contaminants such as aluminum and iron.

It is an object of this invention to provide a novel method for the production of calcined magnesium oxide and calcium oxide powders.

It is another object of this invention to provide a method for the production of calcined magnesium and calcium oxide powders having a comparatively high bulk density, said method being conducted at temperatures below about 1,500°C.

It is still another object to provide a method for producing calcined magnesium oxide and calcium oxide powders at temperatures below about 1,500°C, said powders being characterized by a comparatively high bulk density and also by low concentrations of impurities such as aluminum and iron.

Other objects of the invention will be made apparent hereinafter.

SUMMARY OF THE INVENTION

This invention is a method for producing calcined oxide of an alkaline earth metal selected from the class consisting of magnesium and calcium. An aqueous solution of the nitrate of the selected metal is made strongly basic to precipitate the hydroxide. The hydroxide precipitate is recovered and then washed with water to reduce the nitrate concentration therein to a value in the range of 0.5 to 15 weight percent. The resulting washed precipitate is calcined to produce the oxide product.

DESCRIPTION OF THE PREFERRED EMBODIMENTS

Examples I, II, and III (below) illustrate three forms of our process as applied to the production of magnesium oxide powder having a high bulk density (i.e., 1.5 to 2.0 g/cc). Examples I and II are directed to the production of magnesium oxide powder having a high bulk density and, in addition, having an iron content of less than 2 ppm and an aluminum content of less than 5 ppm. Such powders are well suited as the starting material from which optically-quality single crystals of the oxide can be grown by submerged-arc fusion. Such powders will be referred to hereinafter as fusion-grade oxides. Example III is directed to the production of magnesium oxide powder having a bulk density in the range of 1.5 to 2.0 g/cc but having too high an iron and aluminum content to be well suited for the production of optical-quality crystals. Such oxide powder would, however, be suitable for use in crucibles, firebricks, and the like.

Examples IV and V, below, illustrate our process as applied to the production of high-bulk-density CaO.

EXAMPLE I

In accordance with our method, fusion-grade MgO is produced as follows.

A slurry consisting of about 200 g commercial-grade MgO powder and 500 g distilled water is combined, at about room temperature, with sufficient nitric acid to dissolve the powder. Additional distilled water is added, and the resulting magnesium nitrate solution ($\approx 3-3.5$ M) is decanted to separate it from various impurities which are less soluble in the nitric acid than is MgO.

The pH of the decanted magnesium nitrate solution is adjusted to a value in the range of about 7.5 to 8.3 by the addition of 28 percent ammonium hydroxide, thus precipitating iron, aluminum, and various other impurities as insoluble hydroxides. After permitting most of the precipitate to settle, the solution is separated therefrom by decanting into a medium-porosity, sintered-Pyrex Buchner funnel. The solution passing through the funnel is passed through a 220-nm Millipore filter disc.

The pH of the resulting magnesium nitrate "feed" solution (Molarity, $\approx 3$ M) is adjusted to within the range of 10 to 13.5 by the addition of ammonium hydroxide in order to precipitate the magnesium as the hydroxide. The ammonium hydroxide used as the precipitating agent is selected to be highly pure and may be further purified by filtration, if desired. The mother liquor is separated from the precipitate, and the latter is dried. The resulting cake of magnesium hydroxide then is washed by slurrying in distilled water, the volume of water being selected to be about eight times that of the cake, and the slurry being sparged with air. After washing for about five minutes, the waste water is removed. This washing operation is repeated three times to dissolve ammonium nitrate and hydroxides of some of the more soluble cationic impurities sorbed on the magnesium hydroxide precipitate.

The washed precipitate is combined with distilled water, and the resulting mixture is loaded into a plastic centrifuge cone for additional washing. The cone is centrifuged at about 1,700 rpm for 10–20 minutes in a standard swinging-bucket rotor. After centrifuging, the covering liquid is decanted from the tube. The washing and centrifuging operation is repeated as required to reduce the concentration of ammonium nitrate in the hydroxide cake to a selected value in the range of from about 0.5 to 15 weight percent as the nitrate on a dry basis. The nitrate concentration can be determined conveniently by various known techniques, such as ultraviolet light absorption, polarography, or oxidimetric titration. References herein to weight percent nitrate refer to measurements made on a dry basis.

After the final centrifuging operation, the magnesium hydroxide cake is dried in air at a temperature of about 110°C. The above-mentioned precipitation of the magnesium hydroxide and the subsequent washing operations are conducted at a temperature in the range of about 23–30°C, since the precipitate is most easily separated in this range.

The dried magnesium hydroxide is calcined to the oxide in high-purity magnesia crucibles placed in open-topped furnaces lined with magnesia brick to prevent pickup of furnace materials in the powder. The loaded crucibles are heated, over a period of 2 hours, to about 400°C, during which period the nitrate decomposes and liberates brown fumes. The temperature is maintained at 400°C for an additional 2 hours and then is raised to 1,200°C, where it is maintained for about 16 hours. The bulk density of the magnesium oxide at the end of this period is about 0.9 g/cc. Magnesia-lined covers now are placed on the crucibles and they are furnaced at 1,450°C for an additional 16 hours. The resulting magnesium oxide is fusion-grade, being characterized by a bulk density in the range of about 1.5 to 2.0 g/cc and a purity permitting the growth of high-quality single crystals of MgO by submerged-arc fusion. The overall yield for the process is about 30 percent.

Commenting on the foregoing example, care is taken throughout the various steps of this form of our process to minimize contamination of the various process materials. For example, scraping of precipitate from the processing equipment is avoided, and the equipment used in the wet chemical operations is coated with an inert material, such as polytetrafluoroethylene.

Table 1 refers to Example I and compares the purities of the starting MgO powder and the product MgO minimize Column 1 identifies various elements present in the commercial-grade MgO starting material (bulk density, 0.6 g/cc). Column 2 lists the concentrations of these impurities in the starting material, and Column 3 lists the corresponding concentrations in the product magnesium oxide. Column 4 shows the corresponding impurity concentrations in the product oxide when produced as in Example I but using standard (uncoated) glassware in some of the operations preceding calcination. The concentrations shown in the table are in parts per million as determined by emission spectroscopy.

TABLE 1

| Element | Commercial-grade MgO | Coated Equipment | Non-coated Equipment |
|---|---|---|---|
| Al | 20 | 2.1 | <5 |
| B | 5 | 15 | 20 |
| Ca | 28 | 14 | 4.3 |
| Fe | 3.5 | 0.5 | 0.5 |
| K | 8 | 4.3 | 5.3 |
| Na | 30 | 20 | 73 |
| Si | 100 | 50 | 70 |

We have found in various experimental runs similar to Example I that a bulk density in the desired range of about 1.5 to 2.0 g/cc is not obtained unless the nitrate concentration of the washed magnesium hydroxide to be calcined is in the range of about 0.5 to 15 weight percent. Our experiments have shown that a bulk density of about 1.5 g/cc is obtained at either extreme of the aforementioned range of nitrate concentration, and that the bulk density gradually increases as the range of nitrate concentration narrows, the maximum bulk density (about 2.0 g/cc) occurring at nitrate concentrations in the range of about 2–3 weight percent.

EXAMPLE II

This form of our process is similar to that described in Example I, with the exception that the above-mentioned purified magnesium nitrate feed solution is prepared by combining distilled water and commercially available high-purity magnesium nitrate, the latter having been prepared by crystallization from concentrated solution at a pH in the range of about 1 to 7. The resulting MgO powder product has a bulk density and a purity virtually the same as obtained in Example I.

Referring to Examples I and II, the precipitation of magnesium hydroxide from the "feed" solution preferably is accomplished by the addition of ammonium hydroxide, since the latter is readily available in a pure form and since it is thermally decomposed during the calcination step and thus does not contaminate the product MgO. Various other water-soluble bases having an ionization constant above $10^{-6}$ may be used as the precipitating agent without objectionably contaminating the product; among these are tetramethyl ammonium hydroxide and other substituted ammonium hydroxides, aliphatic hydroxyl-amines, and hydrazine. Some precursors of ammonium hydroxide— e.g., urea—also may be used.

EXAMPLE III

This example relates to a variation of our process which can be used when the carryover of iron and aluminum into the MgO product is not of concern. This example also illustrates how the bulk density of the product MgO can be increased over the value cited in Example I, this increase being effected by exercising closer control of the amount of nitrate in the washed hydroxide.

In this run, the aqueous feed solution of magnesium nitrate is prepared by mixing water and standard, off-the-shelf magnesium nitrate powder (bulk density, ≈0.7 g/cc). The use of this less highly purified nitrate powder is reflected in a more highly contaminated MgO product than those described above. The various steps employed here to process the nitrate solution to the product MgO are similar to the corresponding steps described in Example I, with the exception that the concentration of nitrate in the washed magnesium hydroxide is controlled to be about 2 to 3 weight percent in order to obtain a higher-bulk-density product. This closer control is accomplished by analyzing the precipitate after each washing and discontinuing the washing after a concentration in the desired range has been obtained. Closer control of the nitrate concentration is reflected in an increased density of the calcined product—a bulk density of 2.04 g/cc, in this instance. The resulting MgO powder is well suited for use in firebricks, crucibles, and the like.

Where, as in Example III, contamination of the product MgO is not of great concern, the precipitation of magnesium hydroxide from the nitrate feed solution can be accomplished not only with the agents previously mentioned but with a number of others, such as the alkali metal hydroxides. The essential point here is that the feed solution be made sufficiently basic (pH above about 10) to precipitate magnesium hydroxide.

As will be apparent from the close chemical similarity of calcium oxide and magnesium oxide, the subject process is also applicable to the production of calcium oxide having a high bulk density (i.e., 1.4 to 1.9 g/cc) and, if desired, also having high purity with respect to aluminum and iron. That is, such calcium oxide can be produced by processes analogous to those described in Examples I, II, and III. The following is an illustration of our method as applied to the production of non-fusion-grade, high-bulk-density CaO from an aqueous solution of calcium nitrate. As mentioned, commercial-grade calcined CaO typically has a bulk density of about 1 g/cc.

EXAMPLE IV

An aqueous solution of 2 to 4 M calcium nitrate is prepared from distilled water and commercial-grade calcium nitrate crystals. Ammonium hydroxide is added as in Example III to precipitate calcium hydroxide, which is then washed with water until the nitrate concentration (on a dry basis) is about 2 to 3 weight percent. Calcining this product at 1,450°C for 16 hours yields calcium oxide with a bulk density near 1.9 g/cc.

As illustrated below, calcined CaO powder having a bulk density of 1.9 g/cc and reduced concentrations of iron and aluminum can be produced by a process analogous to that of Example I.

EXAMPLE V

An aqueous solution of calcium nitrate ($\approx$2–4 M) is prepared, and the pH is adjusted with ammonium hydroxide to be in the range of about 7.5 to 8.3 to precipitate hydroxides of impurities, principally iron and aluminum. These impurities are removed by filtering as in Example I. An excess of ammonium hydroxide is added to the purified solution to precipitate calcium hydroxide, which is then washed in a manner analogous to that described for magnesium hydroxide to yield a precipitate containing 2 to 3 weight percent nitrate. The recovered precipitate is calcined at 1,450°C for 16 hours to produce calcium oxide with a bulk density of about 1.9 g/cc.

Referring to our process generally, standard crucibles and furnaces can be employed for the calcination of the hydroxide precursor of the product oxide. Although we find it convenient to conduct the calcination in 3 steps, as in Example I, this is not essential. For example, MgO with a bulk density in the range of about 1.5 to 2.0 g/cc and CaO with a bulk density in the range of about 1.4 to 2.0 g/cc can be obtained by gradually heating the hydroxides containing nitrate within the range of 0.5 to 15 weight percent to a temperature in the range of 1,400° to 1,500°C and maintaining this temperature for a period of from about 5 to 20 hours. If longer calcination times are not objectionable, an acceptable product may be obtained by calcining at temperatures as low as 1,200°C for from about 20 to 30 hours.

We do not wish to be bound by any particular theory regarding our discovery that higher bulk densities are obtained by controlling the nitrate concentration in the hydroxide precursor of the oxide. It may be that continued washing tends to electrically charge the hydroxide particles, forming a colloidal dispersion which calcines to low-density oxide, and that this tendency is offset by the inclusion of a selected amount of nitrate ion in the hydroxide.

What is claimed is:

1. The method of producing, in high-bulk-density calcined form, the oxide of an alkaline earth metal selected from the class consisting of magnesium and calcium, which method comprises preparing an aqueous feed solution of the nitrate of the selected metal, increasing the pH of said solution to a value effecting precipitation of the hydroxide of the selected metal, recovering the hydroxide precipitate, washing the recovered precipitate with water to reduce the nitrate concentration therein to a value in the range of 0.5 to 15 weight percent, and calcining the washed precipitate at a temperature in the range of about 1,200°C to 1,500°C.

2. The method of claim 1 wherein said washing is conducted to reduce the nitrate concentration in said precipitate to a value in the range of from 1 to 4 weight percent.

3. The method of claim 1 wherein said calcining step is conducted for a period of from about 5 to 30 hours.

4. The method of claim 1 wherein the concentration of said nitrate in said feed solution is in the range of 2.5 to 3.5 M.

5. The method of claim 1 wherein said hydroxide is precipitated from said feed solution by adjusting the pH thereof to a value above about 10.

6. The method of claim 1 wherein said feed solution is prepared by combining water and a nitrate of the selected metal, said nitrate having been prepared by crystallization from a concentrated solution of said nitrate at a pH in the range of 1 to 7.

7. The method of claim 1 wherein said feed solution is prepared by the following steps: dissolving the oxide of the selected metal in nitric acid, separating the resulting nitrate solution from the undissolved residue, adjusting the pH of the separated nitrate solution to within the range of 7.5 to 8.3 to precipitate iron and aluminum impurities, and separating the resulting purified nitrate solution for use as said feed solution.

8. The method of claim 7 wherein the pH of said nitrate solution is adjusted with a water-soluble base having an ionization constant above about $10^{-6}$ and selected from the group consisting of ammonium hydroxide, substituted ammonium hydroxides, aliphatic hydroxylamines, and hydrazine.

* * * * *